(12) United States Patent
Wu et al.

(10) Patent No.: US 7,359,183 B2
(45) Date of Patent: Apr. 15, 2008

(54) TWO-IN-ONE WIRELESS CONTROL KIT

(75) Inventors: Jack Wu, Zhoughe (TW); Venson Liao, Zhoughe (TW); Chaowu Chien, Zhoughe (TW); Dennis Lin, Zhoughe (TW)

(73) Assignee: Raytac Corp., Zhoughe (TW)

( * ) Notice: Subject to any disclaimer, the term of this patent is extended or adjusted under 35 U.S.C. 154(b) by 0 days.

(21) Appl. No.: 10/940,640

(22) Filed: Sep. 15, 2004

(65) Prior Publication Data

US 2006/0056145 A1  Mar. 16, 2006

(51) Int. Cl.
*H05K 5/00* (2006.01)
(52) U.S. Cl. .................................................... 361/679
(58) Field of Classification Search ...................... None
See application file for complete search history.

(56) References Cited

U.S. PATENT DOCUMENTS 5,418,524 A * 5/1995 Fennell ...................... 340/7.41
H1772 H * 1/1999 Akahane ................. 340/825.22
2005/0130743 A1* 6/2005 Leifer .......................... 463/39

* cited by examiner

*Primary Examiner*—Yean-Hsi Chang
(74) *Attorney, Agent, or Firm*—Troxell Law Office, PLLC

(57) ABSTRACT

A two-in-one wireless control kit is adapted to plug in a PCMCIA slot on a portable apparatus for storing and moving along with the portable apparatus and use at any time, and includes a transmitter and a receiver removably associated with each other to form one unit. The transmitter is provided at an upper side with related keys and at a lower side with at least a battery compartment for accommodating required batteries and a locating recess for receiving the receiver therein. The receiver includes a front connecting end for connecting to a related connecting port on the portable apparatus, and locating structures located at predetermined positions to removably engage the receiver with the locating recess below the transmitter, such that the associated transmitter and receiver can be plugged in the PCMCIA slot without projecting any part from the slot.

3 Claims, 7 Drawing Sheets

TWO-IN-ONE WIRELESS CONTROL KIT

FIELD OF THE INVENTION

The present invention relates to a two-in-one wireless control kit, and more particularly to a wireless control kit that includes a wireless transmitter and a wireless receiver removably associated with each other to form one unit adapted to plug in a PCMCIA (Personal Computer Memory Card International Association) slot on a portable apparatus, such as a notebook computer, for storing in and moving along with the portable apparatus.

BACKGROUND OF THE INVENTION

With the rapid developments in information industry, computer software has been widely used as an aid to replace the conventional projection slides in a briefing or meeting to produce dynamic and vivid reporting contents with sound effect. And, to enable smooth briefing or meeting, wireless control means are frequently used to facilitate easy display and change of reported materials. The currently available wireless control means consists of two physically separate but operatively inseparable elements, that is, a transmitter and a receiver that must cooperate with each other to work. A user often carelessly forgets or omits one of these two separate elements, though they must appear at the same time to work.

To overcome this problem, there has been developed for such wireless control means a transmitter having a receiving space for accommodating a corresponding receiver therein, so as to prevent any one of the two operatively inseparable elements from missing. FIG. 1 is an exploded bottom perspective view showing an example of such transmitter for wireless control means disclosed in Taiwanese New Utility Model Patent No. 92210816 entitled "Positioning Structure for a Receiver of a Wireless Cursor Controller". The transmitter 10 is provided at a front surface with a plurality of related function keys (not shown), and at an inner bottom with a compartment 11. A receiver 12 having a front connecting end 13 for plugging in a related connecting port, such as a USB port (not shown), on a portable apparatus, such as a notebook computer, could be correspondingly positioned in the compartment 11. Then, a cover 14 is removably connected to the bottom of the transmitter 10 to close the compartment 11 and a battery compartment 15 at the same time. This protects the receiver 12 having a relatively small volume from missing when it is not in use. However, the transmitter 10 with the receiver 12 received in the compartment 11 is still an independent member that could not be normally associated with a portable apparatus, such as a notebook computer, and must be separately stored and carried for use. The wireless control means with associated transmitter and receiver has a largely increased volume and is therefore not convenient for carrying along with the use. Moreover, it is still possible for a user to forget or lose the whole wireless control means that is stored at a place different from the portable apparatus.

Currently, there are many products meeting PCMCIA specifications, including, for example, network cards, memory cards, sound cards, etc. However, there is not any transmitter or receiver for currently available wireless control means that meets PCMCIA specifications for plugging in a PCMCIA slot on a portable apparatus, such as a notebook computer, so that the whole wireless control means consisting of removably associated transmitter and receiver could be stored in the PCMCIA slot on the portable apparatus without projecting any part of the wireless control means from the PCMCIA slot, and conveniently carried along with the portable apparatus for use at any time.

SUMMARY OF THE INVENTION

A primary object of the present invention is to provide a two-in-one wireless control kit, which is adapted to plug in a PCMCIA slot on a portable apparatus without projecting any part of the control kit from the PCMCIA slot to facilitate storing and moving of the wireless control kit along with the portable apparatus for use at any time.

To achieve the above and other objects, the two-in-one wireless control kit of the present invention includes a transmitter and a receiver removably associated with each other to form one unit. The transmitter is provided at an upper side with related keys and at a lower side with at least a battery compartment for accommodating required batteries and a locating recess for receiving the receiver therein, and a force-application section provided at a peripheral position of the locating recess. The receiver includes a front connecting end for connecting to a related connecting port on the portable apparatus, and locating structures located at predetermined positions to removably engage the receiver with the locating recess below the transmitter, such that the associated transmitter and receiver can be plugged in a PCMCIA slot of the portable apparatus without projecting any part from the PCMCIA slot.

In a preferred embodiment of the present invention, the locating structures on the receiver include two beveled guide shoulders located at two sides of a joint of a main body and the front connecting end of the receiver, a dot formed on each guide shoulder, and two curved guide slots provided at a rear end of the receiver. And, the locating recess provided below the transmitter corresponding to the shape of the receiver is provided at two inner sidewalls close to a front end thereof with two guide grooves corresponding to the dots on the two beveled guide shoulders of the receiver, and at a rear end of the two inner sidewalls with two engaging wings corresponding to the two curved guide slots on the receiver.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIGS. 5A, 5B, and 5C are partially enlarged views of the circled areas of FIG. 5;

FIGS. 6A and 6B are partially enlarged views of the circled areas of FIG. 6.

DETAILED DESCRIPTION OF THE PREFERRED EMBODIMENTS

Figure 1:
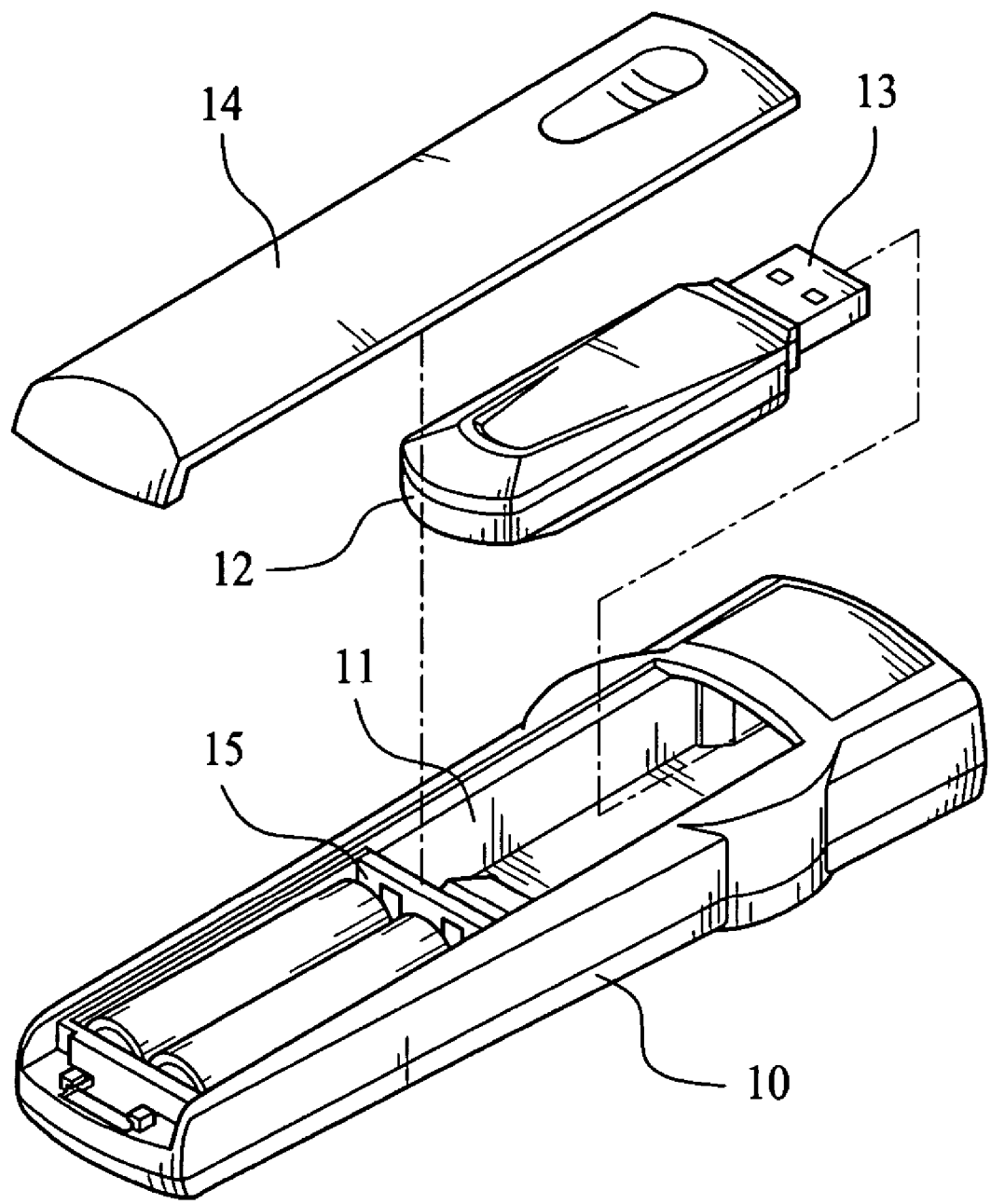
FIG. 1 is an exploded bottom perspective view of a conventional wireless control means.
Figure 2:
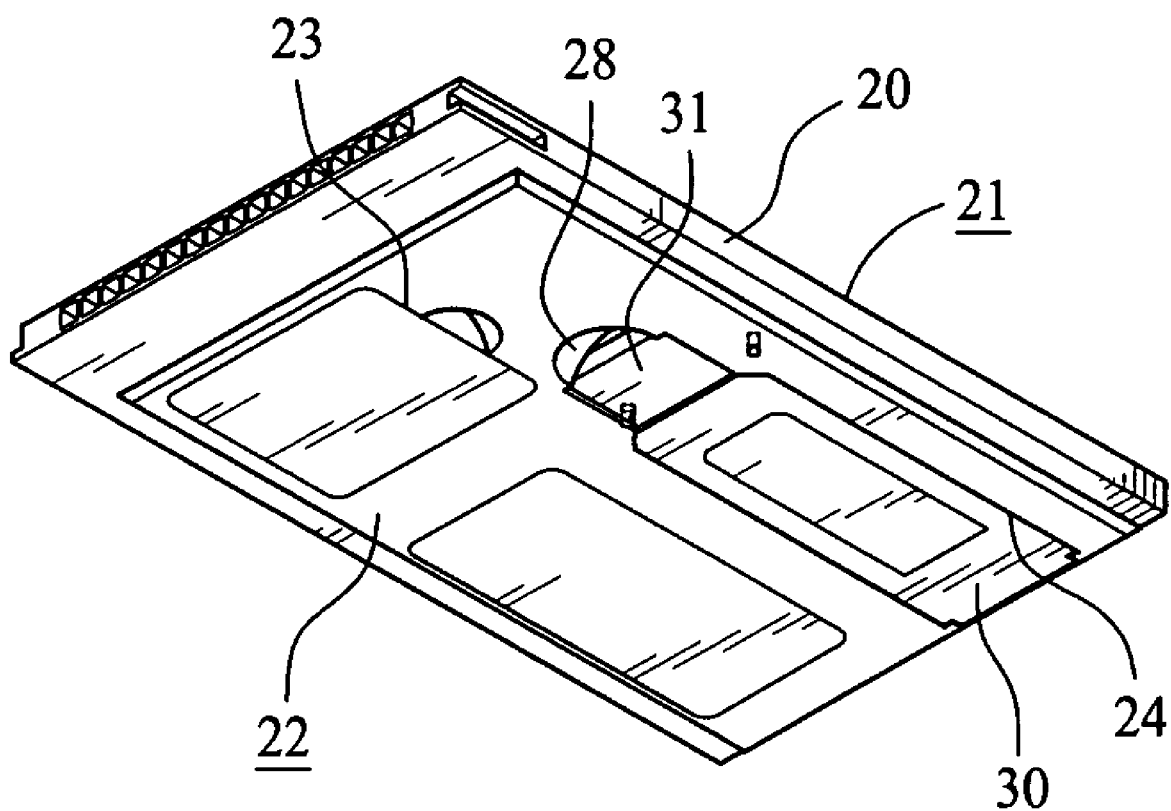
FIG. 2 is an assembled bottom perspective view of a two-in-one wireless control kit according to a preferred embodiment of the present invention.
Figure 3:
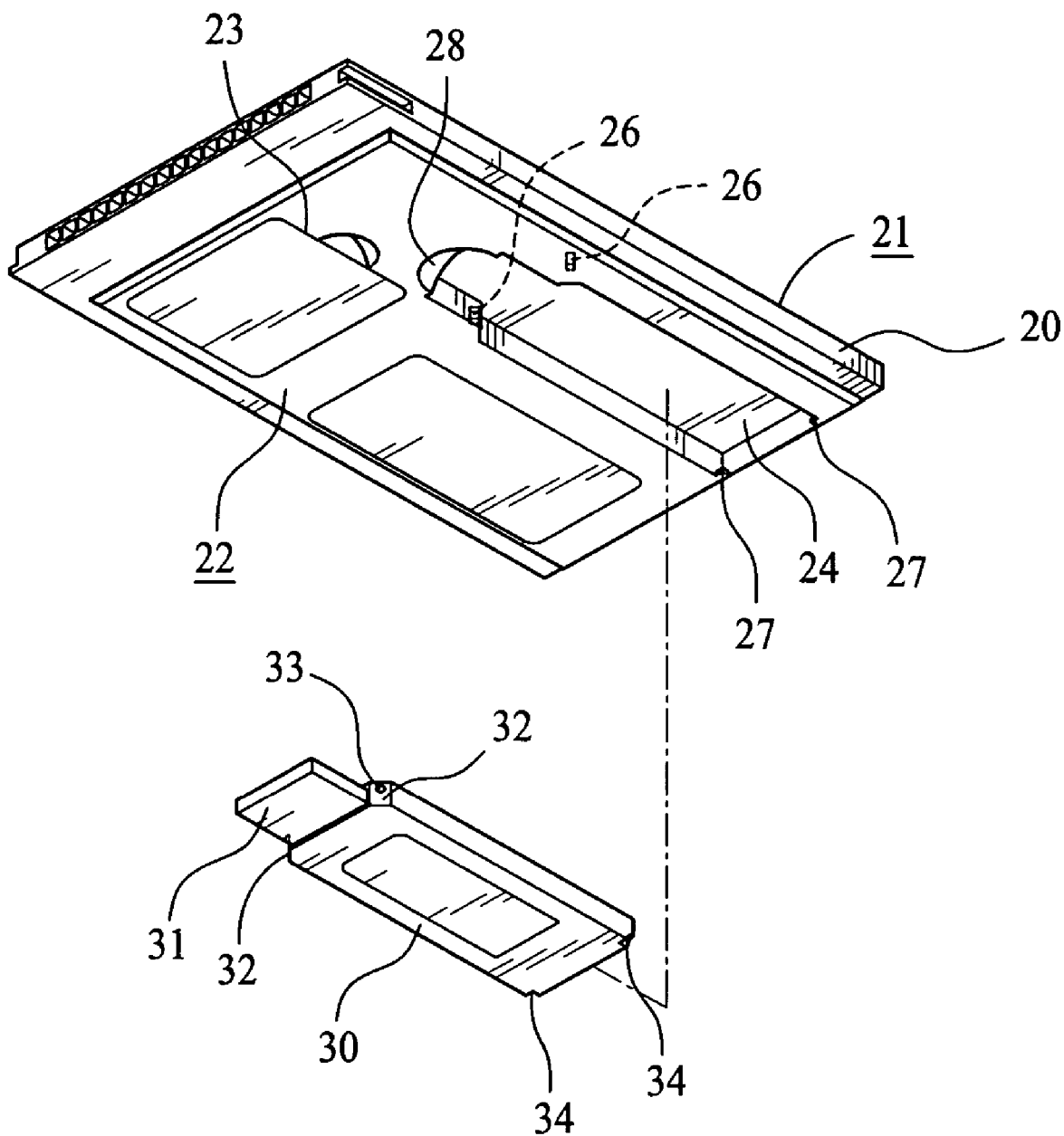
FIG. 3 is an exploded perspective view of FIG. 2 showing a receiver and a transmitter of the wireless control kit are separated from one another.

Please refer to FIG. 2 that is an assembled bottom perspective view of a two-in-one wireless control kit according to a preferred embodiment of the present invention. As shown, the present invention includes a transmitter 20 and a receiver 30 removably set in a predetermined position on the transmitter 20, so that the transmitter 20 and the receiver 30 are normally associated with one another to form one unit.

Although not completely shown in FIG. 2, the transmitter 20 has an upper side 21 having some related keys 25 provided thereon, including, for example, Page Up, Page Down, Mouse, and Function keys (see FIGS. 4–7).

Figure 7:
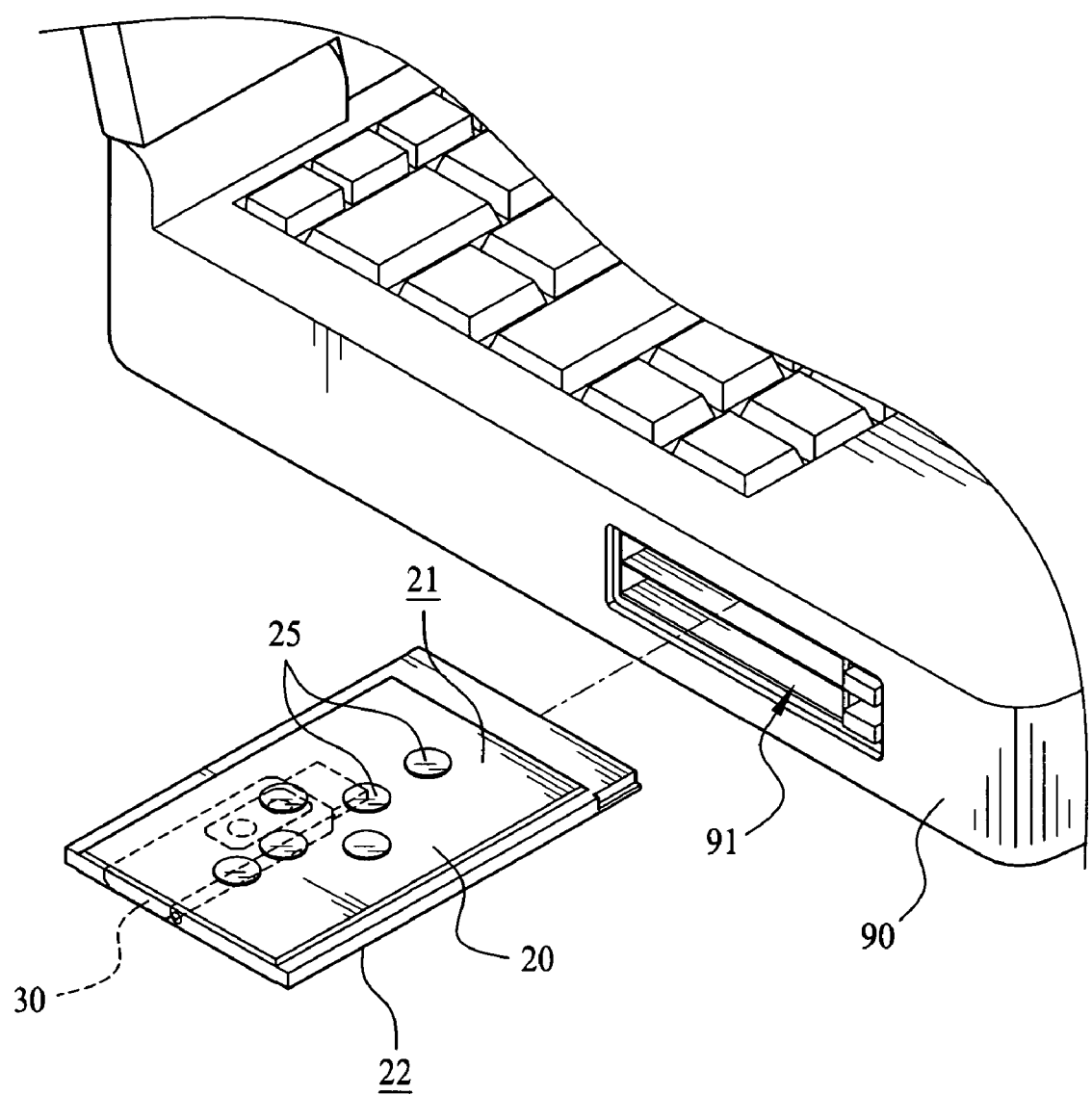
FIG. 7 shows the present invention is ready for plugging in a notebook computer.

Meanwhile, the whole transmitter 20 has a shape corresponding to a PCMCIA slot 91 on a portable apparatus 90, such as a notebook computer (see FIG. 7). That is, the whole transmitter 20 is a flat plate that could be completely inserted into the PCMCIA slot 91 on the portable apparatus 90 without projecting any part of it from the slot 91.

The transmitter 20 is provided at a lower side 22 with at least a battery compartment 23 and a locating recess 24 having a contour corresponding to that of the receiver 30 for receiving required batteries (not shown) and the receiver 30, respectively. That is, the transmitter 20 and the receiver 30 are associated with one another to constitute the two-in-one wireless control kit in the form of a flat plate, as shown in FIG. 2, enabling the present invention to be completely plugged in the PCMCIA slot 91 on the portable apparatus 90 without projecting from the slot 91. In this manner, the two-in-one wireless control kit of the present invention could be stored, carried or moved along with the portable apparatus and ready for use at any time.

In the illustrated embodiment, the receiver 30 is provided with a front connecting end 31 for plugging in a related connecting port (not shown) on the portable apparatus 90, and has locating structures provided at related positions for firmly setting the receiver 30 in the locating recess 24 of the transmitter 20.

Please refer to FIGS. 3 to 6 at the same time. In the illustrated preferred embodiment of the present invention, the locating structures on the receiver 30 include two beveled guide shoulders 32 provided at two sides of a joint of a main body and the front connecting end 31 of the receiver 30, a dot 33 formed on each guide shoulder 32, and two curved guide slots 34 provided at two lower rear corners of the receiver 30. On the other hand, the locating recess 24 provided below the transmitter 20 corresponding to the shape of the receiver 30 is provided at two inner sidewalls close to a front end thereof with two guide grooves 26 corresponding to the dots 33 on the two beveled guide shoulders 32 of the receiver 30, and at two rear lower corners of the two inner sidewalls with two engaging wings 27 corresponding to the two curved guide slots 34 on the receiver 30. To facilitate easy removal of the receiver 30 from the locating recess 24, a force-application section is provided at an end of the locating recess 24. In the illustrated embodiment, the force-application section is a finger notch 28 formed at a front end of the locating recess 24.

Figure 4B:
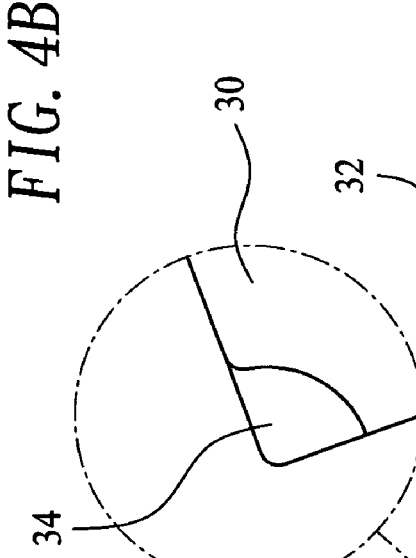
FIGS. 4A and 4B are partially enlarged views of the transmitter and the receiver of FIG. 4, respectively.
Figure 4A:
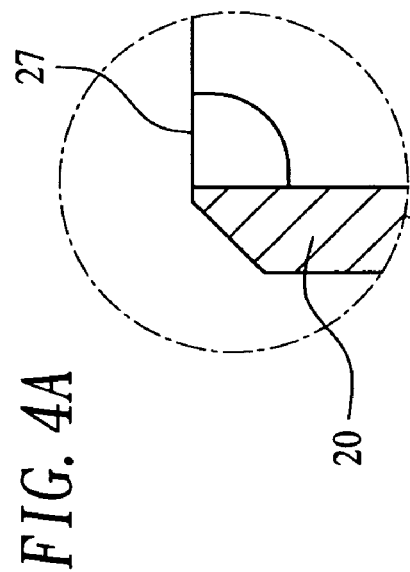
Figure 4:
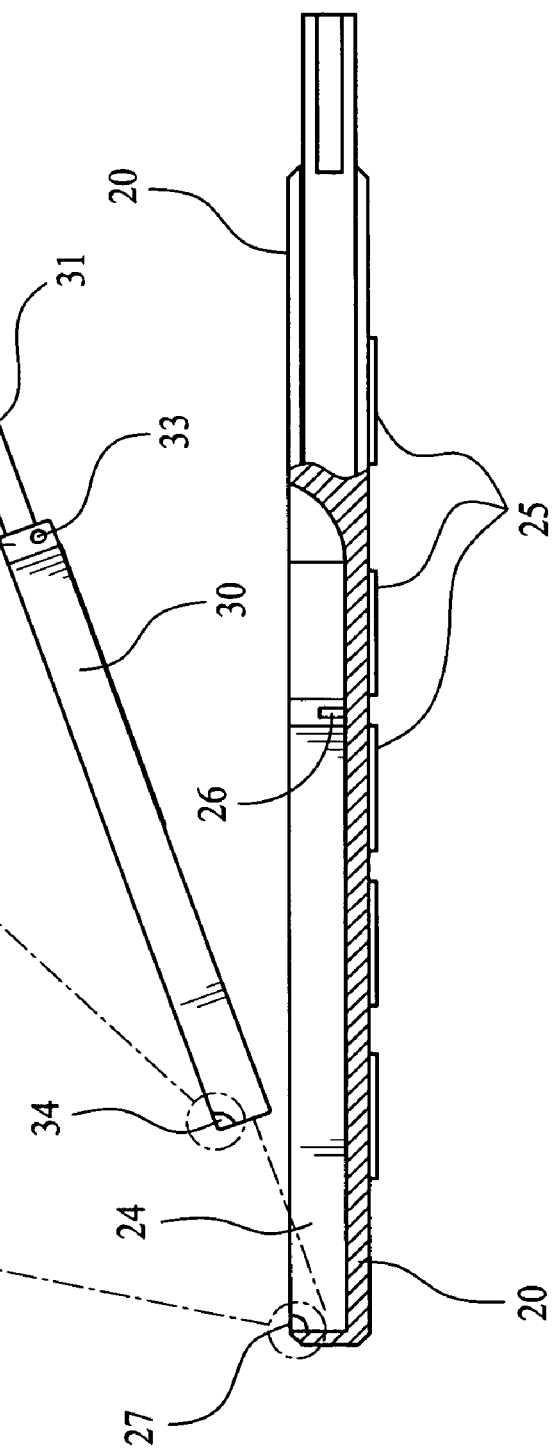
FIG. 4 is a sectioned side view showing the receiver is ready for setting in the transmitter of the two-in-one wireless control kit of the present invention.
Figure 5:
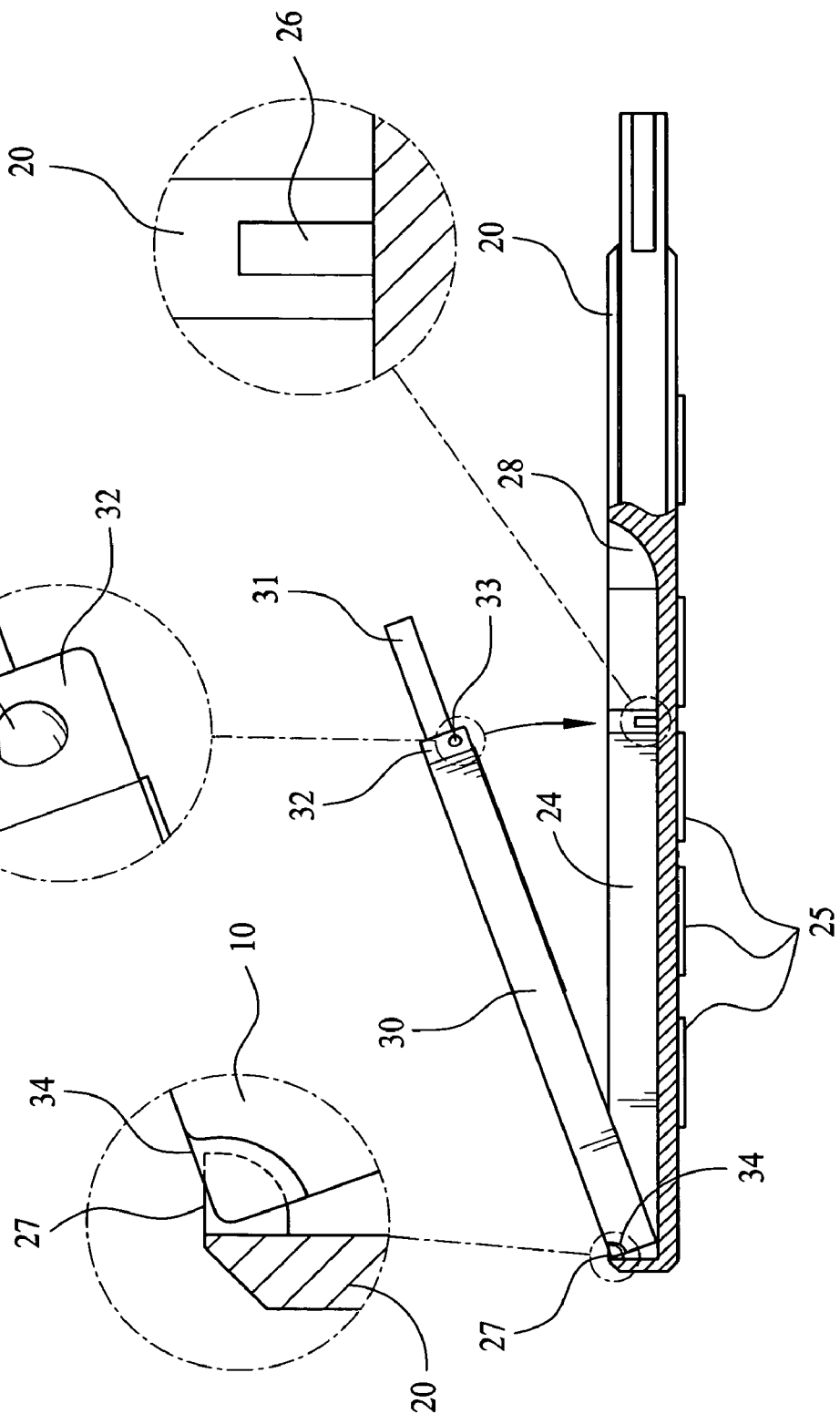
FIG. 5 is a sectioned side view showing the receiver and the transmitter of the two-in-one wireless control kit of the present invention have been primarily connected to one another.
Figure 6:
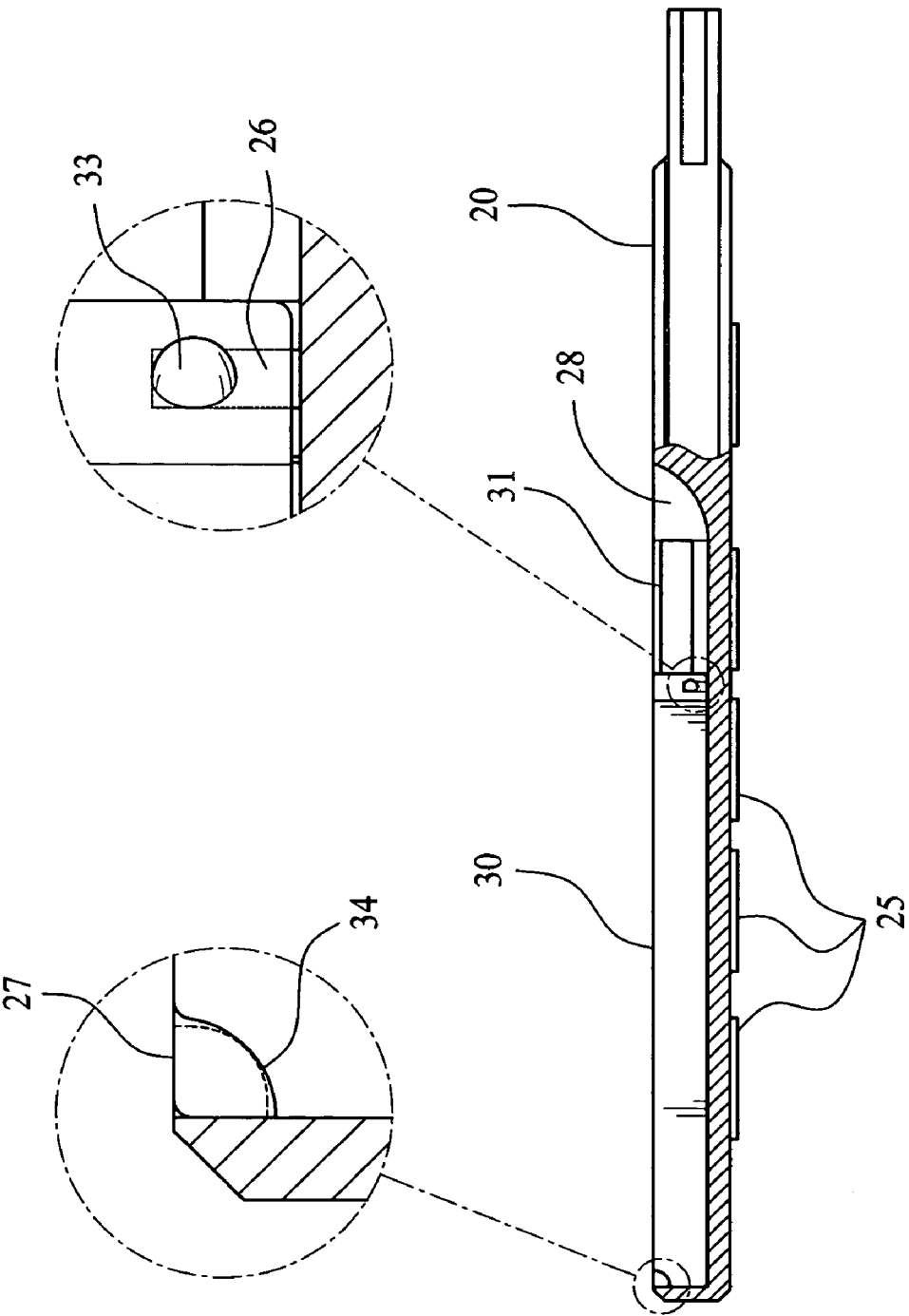
FIG. 6 is a sectioned side view showing the receiver and the transmitter of the two-in-one wireless control kit of the present invention have been completely associated with one another.

FIGS. 4, 5, and 6 illustrate the steps of locating the receiver 30 in the locating recess 24 below the transmitter 20. Please refer to FIGS. 4, 4A, and 4B first. The receiver 30 is tilted to point the two curved guide slots 34 toward the two engaging wings 27 of the locating recess 24, so that the curved guide slots 34 primarily engage with the engaging wings 27, as shown in FIGS. 5 and 5A. Then, pivotally turn the receiver 30 downward about the primarily engaged guide slots 34 and engaging wings 27, as indicated by the arrow in FIG. 5, until the dots 33 (see FIG. 5B) on the beveled guide shoulders 32 are moved into and engaged with the two guide grooves 26 (see FIG. 5C) on the inner sidewalls of the locating recess 24, as shown in FIGS. 6 and 6B. At this point, the curved guide slots 34 and the engaging wings 27 are also fully engaged with one another, as shown in FIG. 6A, to firmly hold the receiver 30 to the locating recess 24 below the transmitter 20, forming the two-in-one wireless control kit of the present invention.

As can be seen from FIG. 7, the two-in-one wireless control kit of the present invention may be then plugged in the PCMCIA slot 91 of the portable apparatus 90 without projecting any part from the slot 91, and stored, carried or moved along with the portable apparatus 90 for use at any time. The two-in-one wireless control kit plugged in the PCMCIA slot 91 could be removed from the slot 91 via an eject button provided in the vicinity of the slot 91. And, the receiver 30 could be separated from the transmitter 20 simply by applying a minor upward force at the finger notch 28 to disengage the dots 33 on the beveled guide shoulders 32 of the receiver 30 from the guide grooves 26 on the inner sidewalls of the locating recess 24 of the transmitter 20, and removing the receiver 30 from the locating recess 24 by performing the above-described locating procedures reversely. The separated receiver 30 may then be plugged in a related connecting port on the portable apparatus 90 for use.

The two-in-one wireless control kit of the present invention not only has receiver and transmitter adapted to associate with one another to form one unit, but also has a configuration allowing it to be held in a PCMCIA slot on a portable apparatus for storing and moving along with the latter and use at any time. With the above arrangements, a user could conveniently carry the receiver and the transmitter, which are two operatively inseparable parts in wireless control, without the risk of carelessly losing any one of the two parts.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A two-in-one wireless control kit, comprising a transmitter and a receiver that are removably associated with one another to form one unit;

said transmitter being provided at an upper side with related keys, and at a bottom side with at least a battery compartment for accommodating required batteries and a locating recess having a shape corresponding to that of said receiver for accommodating said receiver therein, and at a peripheral edge of said locating recess with a force-application section;

said transmitter with said receiver associated therewith having a configuration corresponding to a PCMCIA slot for plugging in a PCMCIA slot on a portable apparatus without projecting any part of said transmitter from said PCMCIA slot; and said receiver including a front connecting end for plugging in a related connecting port on the portable apparatus, and having locating structures provided at predetermined positions for firmly setting said receiver in said locating recess below said transmitter.

2. The two-in-one wireless control kit as claimed in claim 1, wherein said locating structures provided on said receiver include two beveled guide shoulders located at two sides of a joint of a main body and said front connecting end of said receiver, a dot formed on each said guide shoulder, and two curved guide slots provided at a rear end of said receiver; and wherein said locating recess provided below said transmitter corresponding to the shape of said receiver is provided at two inner sidewalls close to a front end thereof with two guide grooves corresponding to said dots on said two beveled guide shoulders of said receiver, and at a rear end of said two inner sidewalls with two engaging wings corresponding to said two curved guide slots on said receiver.

3. The two-in-one wireless control kit as claimed in claim 1, wherein said force-application section is a finger notch provided at a front end of said locating recess below said transmitter.

* * * * *